(12) United States Patent
Blair

(10) Patent No.: US 9,455,896 B2
(45) Date of Patent: Sep. 27, 2016

(54) DEDICATED NETWORK INTERFACE

(75) Inventor: Christopher Douglas Blair, South Chailey (GB)

(73) Assignee: Verint Americas Inc., Alpharetta, GA (US)

( * ) Notice: Subject to any disclaimer, the term of this patent is extended or adjusted under 35 U.S.C. 154(b) by 1215 days.

(21) Appl. No.: 12/015,621

(22) Filed: Jan. 17, 2008

(65) Prior Publication Data

US 2009/0028144 A1 Jan. 29, 2009

Related U.S. Application Data

(60) Provisional application No. 60/951,404, filed on Jul. 23, 2007.

(51) Int. Cl.
*H04L 12/28* (2006.01)
*H04L 12/26* (2006.01)
*H04L 29/06* (2006.01)

(52) U.S. Cl.
CPC ........... *H04L 43/18* (2013.01); *H04L 63/0227* (2013.01)

(58) Field of Classification Search
None
See application file for complete search history.

(56) References Cited

U.S. PATENT DOCUMENTS

| | | | |
|---|---|---|---|
| 5,754,768 A * | 5/1998 | Brech et al. | 709/230 |
| 6,393,487 B2 | 5/2002 | Boucher et al. | |
| 6,487,200 B1 * | 11/2002 | Fraser | 370/389 |
| 6,781,992 B1 | 8/2004 | Rana et al. | |
| 6,847,632 B1 | 1/2005 | Lee et al. | |
| 6,865,604 B2 | 3/2005 | Nisani et al. | |
| 6,954,463 B1 * | 10/2005 | Ma et al. | 370/401 |
| 7,349,398 B1 | 3/2008 | Favor et al. | |
| 7,480,308 B1 | 1/2009 | Cohen et al. | |
| 7,590,230 B1 * | 9/2009 | Surazski | 379/202.01 |
| 7,899,038 B2 | 3/2011 | Ulybin | |
| 2004/0187033 A1 * | 9/2004 | Wang | 713/201 |
| 2005/0281204 A1 * | 12/2005 | Karol et al. | 370/248 |
| 2006/0077989 A1 * | 4/2006 | Lu et al. | 370/401 |
| 2006/0187911 A1 * | 8/2006 | Huotari et al. | 370/389 |
| 2006/0203807 A1 * | 9/2006 | Kouretas et al. | 370/352 |

(Continued)

FOREIGN PATENT DOCUMENTS

| | | |
|---|---|---|
| EP | 0813326 | 12/1997 |
| EP | 1788489 | 5/2007 |

OTHER PUBLICATIONS

Quittek, J., "Requirements for IP Flow Information Export", IETF Standard Working Draft, Internet Engineering Task Force, IETF, CH, Jun. 1, 2004, pp. 1-32, vol. ipfix, No. 16.

(Continued)

*Primary Examiner* — Jae Y Lee
*Assistant Examiner* — Thinh Tran
(74) *Attorney, Agent, or Firm* — Meunier Carlin & Curfman

(57) ABSTRACT

Computer communications that are to be recorded are visible to a network interface on a recording computer. The network interface receives the packets to be recorded. The network layer of the recording computer implements a subset of the normal IP module in the network layer. Instead of checking every IP packet, the IP module in the network layer assumes that most IP packets are correctly addressed, internally consistent and of the expected protocol type. The recording computer allocates the received packets to a recording session based upon the value of a field that is at a fixed position within the packet. Packets that are allocated to a session are recorded or associated with other packets that have been allocated to the same session.

22 Claims, 7 Drawing Sheets

(56) References Cited

U.S. PATENT DOCUMENTS

| | | | |
|---|---|---|---|
| 2007/0230446 A1* | 10/2007 | Williams et al. | 370/352 |
| 2007/0230486 A1* | 10/2007 | Zafirov | 370/401 |
| 2008/0004011 A1* | 1/2008 | Ober | 455/435.1 |
| 2008/0310428 A1* | 12/2008 | Lei et al. | 370/400 |
| 2010/0235464 A1* | 9/2010 | Iyer | H04W 4/00 709/217 |

OTHER PUBLICATIONS

Notice of Allowance dated Oct. 28, 2011 issued in U.S. Appl. No. 12/173,146.

\* cited by examiner

DEDICATED NETWORK INTERFACE

RELATED APPLICATIONS

This application hereby claims the benefit of and priority to U.S. Provisional Patent Application No. 60/951,404, entitled "COMMUNICATIONS RECORDING", filed on Jul. 23, 2007, and which is hereby incorporated by reference in its entirety.

TECHNICAL FIELD

The invention is related to the field of recording communications.

TECHNICAL BACKGROUND

Computer communications carried over computer networks may be recorded. Typically, a computer is used to collect and record the communications. The collection of computer communications is done in three main ways. "Promiscuous mode tapping" collects all packets on the network and then the recording computer filters these to determine which to keep. In a "conference bridge approach," the recording computer becomes a participant in the call and receives packets from the other participants and/or from a conference bridge. Lastly, a party (e.g. computer) in the communication may forward packets or derivatives of packets that form the communication session to the recording computer.

The recording computer typically taps the network or receives the communication to be recorded over an industry standard Network Interface Card (NIC) which supports a protocol stack. This would typically include the TCP/IP stack.

However, the recording application can be very demanding of the performance capabilities of the recording computer. For example, when recording communications using promiscuous mode tapping on some of the most advanced networks, the recording computer may receive data at a rate of 10 gigabits per second. That may translate to as many as 1.25 gigabytes per second that need to be processed, filtered, and ultimately recorded by the recording computer. This amount of processing may overload some recording computers, thereby resulting in the loss of some of the communications that should have been recorded. Accordingly, to prevent data loss and allow the use of less expensive computers as recording computers, there is a need in the art for more efficient recording systems.

SUMMARY

Computer communications that are to be recorded are visible to a network interface on a recording computer. The network interface receives the packets to be recorded. The network layer of the recording computer implements a subset of the normal IP module in the network layer. Instead of checking every IP packet, the IP module in the network layer assumes that most IP packets are correctly addressed, internally consistent and of the expected protocol type. The recording computer allocates the received packets to a recording session based upon the value of a field that is at a fixed position within the packet. Packets that are allocated to a session are recorded or associated with other packets that have been allocated to the same session.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

FIGS. 1-7 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Figure 1:
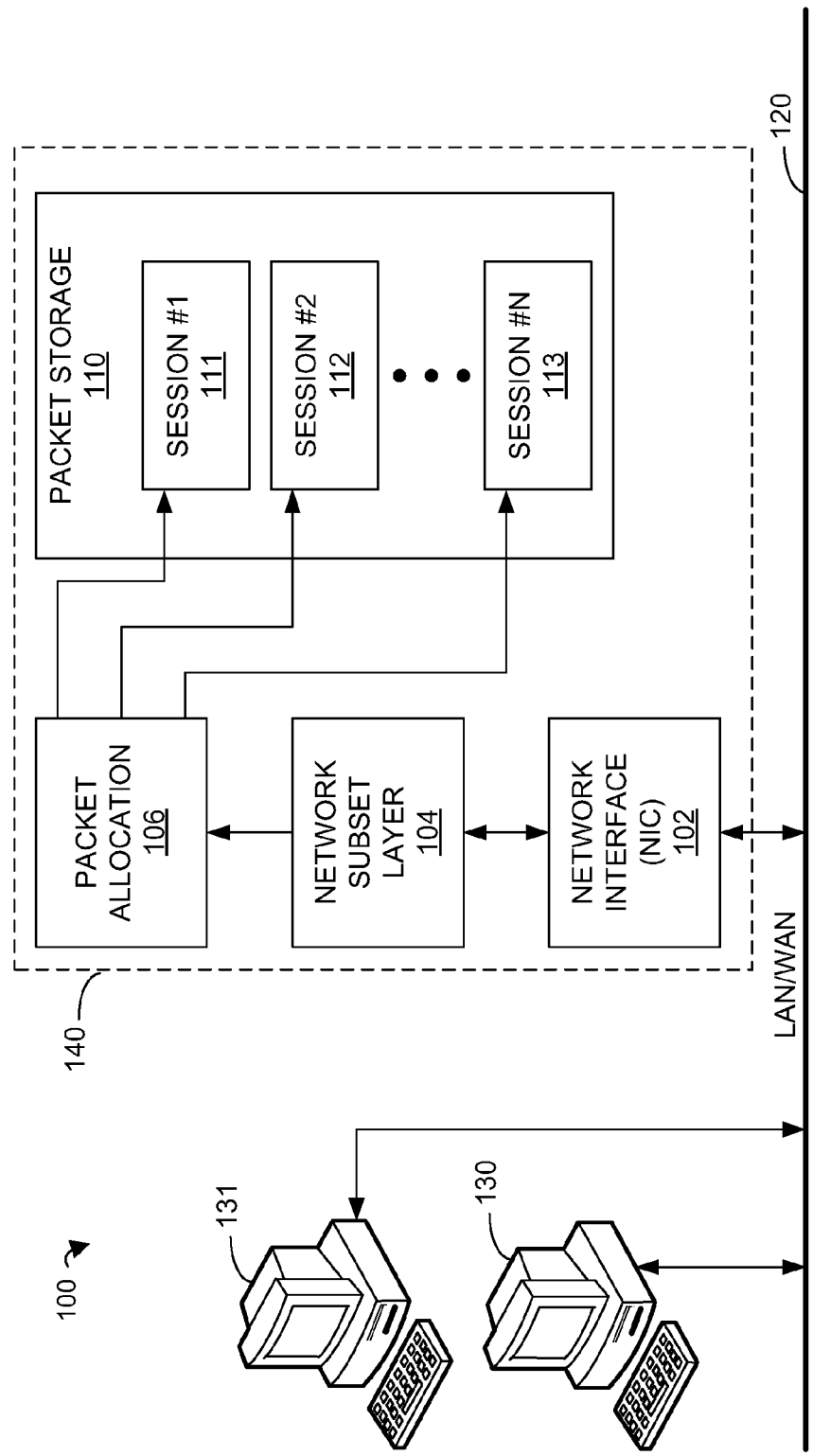
FIG. 1 is a block diagram illustrating a system for recording computer communication sessions.

FIG. 1 is a block diagram illustrating a system for recording computer communication sessions. Communication recording system 100 includes computers 130 and 131 operatively coupled to network 120. Recording computer 140 is also operatively coupled to network 120. Network 120 may be a Local Area Network (LAN) or a Wide Area Network (WAN) or some other form of computer communications network. Recording computer 140 includes network interface 102. Network interface 102 is operatively coupled to network 120. Network interface 102 is also operatively coupled to network subset layer 104. Network subset layer 104 is operatively coupled to packet allocation 106. Packet allocation 106 is operatively coupled to packet storage 110. Packet storage includes session #1 111, session #2 112 and session #N 113. Packet allocation 106 is operatively coupled to each of sessions 111-113. Sessions 111-113 may correspond to a group of packets that a recording application desires to group together or otherwise associate, such as a voice over Internet Protocol call (VoIP), or all the packets to or from a particular internet phone.

Computers 130 and 131 may direct communications to be recorded to recording computer 140 via network 120. An example of communications that can be directed to recording computer 140 are VoIP telephone calls. For example, to record the contents of a VoIP call between computers 130 and 131, a VoIP application running on computer 131 may send packets to recording computer 140 as if it were also a participant in a conference call. Recording computer 140 could then record the VoIP packets (grouped, for example, as a session #1 111) so that the audio contents of the call may be reconstructed and replayed. In another example, computer 131 may store a local copy of the VoIP or digitized version of a Plain Old Telephone System (POTS) call. At a certain time, perhaps when network 120 and/or computer 131 is not busy, this local copy is then sent to recording computer 140 via network 120.

Other forms of directing communications to recording computer 140 are also possible. For example, using port mirroring, all of the packets that come from, go to, or pass through, a given network router, switch, or other device may be directed to recording computer 140 by that device. In an example, these mirrored packets may be encapsulated in order to specify the IP address of NIC 102 thus ensuring proper routing of the packet on its way to NIC 102. In another example, the mirrored packets may be encapsulated and sent as the payload of an RTP packet stream. The destination IP address of these RTP packets may be set to that of the recorder's dedicated NIC 102, and the UDP port number field is set to a value representing a specific recorded session. Details of which UDP port number relates to which recording session, such as source and destination IP addresses and ports, may be exchanged separately between recording computer 140 and the device that encapsulates the packets. In this case, depending upon the method chosen, recording computer 140 may or may not need to un-encapsulate and/or forward those packets back to network 120 (or another network, not shown) so they may ultimately be routed to the appropriate destination. In another example, a similar approach may be used with a TCP socket in place of an RTP packet stream. This would allow more reliable transmission of the stream. This increased reliability is particularly important in cases where the occasional loss of a packet is unacceptable. For example, when email is being recorded by recording computer 140, the occasional loss of a packet as may occur when using RTP is unacceptable.

The operative coupling of recording computer 140 and network 120 may be described by a reference model for communications and network protocol design. This description may be referred to as the TCP/IP or Internet reference model and includes five layers. These layers, which are all operatively coupled, may be referred to as the physical layer, the data link layer, the network/internet layer, the transport layer, and the application layer. The physical layer may be implemented by an Application Specific Integrated Circuit (ASIC) or other analog and digital electronics. The elements of the physical layer may reside in network interface 102. The data link layer may also be implemented on network interface 102 by firmware cooperating with hardware driver software in the operating system of recording computer 140. The network layer and transport layer may be implemented in the operating system software running on recording computer 140.

After network interface 102 receives a packet and processes the packet through the physical and data link layers into a form suitable for the network layer, it passes the packet to the network subset layer 104. Network subset layer 104 processes and responds to the packets received from the data link layer to implement at least one of the network layer functions. For example, network subset layer 104 may check the destination address field of the header of a packet in Internet Protocol (IP) form. Examples of IP packet formats are given by IPv4 and IPv6.

In another example, the data link layer may determine that the packet is an Address Resolution Protocol (ARP) request. The network subset layer 104 may then respond appropriately. In another example, the data link layer may determine that the packet is an IP packet. In this case, the network subset layer 104 may pass the packet to the transport layer (e.g. packet allocation 106) without further checks or processing. In addition, network subset layer 104 may also implement other functions or protocols necessary for recording computer 140 to perform the function of recording packets directed to it via network 120.

Packet allocation 106 receives packets from network subset layer 104. Packet allocation 106 may be part of a transport layer or may be implemented separately. In an embodiment, packet allocation 106 may accomplish the function of allocating packets passed to it by the network layer by examining a value at a fixed location, or offset, in each packet and using this value as a basis to identify a session.

In an embodiment, if the packet is formatted as a User Datagram Packet (UDP), then the value at the fixed location may be, for example, the destination port number of the packet. In an embodiment, packet allocation 106 may allocate packets based upon the destination port number of the packet. For example, packet allocation 106 may allocate a packet to session #1 111 when the destination port number of the packet is 1. Packet allocation 106 may also allocate a packet to session #2 112 when the destination port number of the packet is 2. This function may also be used with arbitrary port number-session number pairings such as allocating packets with a destination port number of 73 to session #N 113 where "#N" is an arbitrary identifier of the session these packets are to be associated with such as 99, or "VoIP call between 970-555-1234 and 408-555-9876 from 11:05 to 13:07 on Oct. 9, 2007", or email "message-ID=14432593.1191958317010." Once packets are allocated to a session, they are stored in packet storage 110 and associated with the one of sessions 111-113 to which they were allocated.

Packets may be allocated to a particular recording stream and sent to packet storage 110 without further processing by the transport or application layers, thus saving machine cycles or other resources on recording computer 140. These machine cycles and resources are saved by not subjecting the packets sent to packet allocation 106 to all of the examination normally undertaken by a full network layer. Specifically, the assumption that all IP packets received will be for a single IP address and/or that only UDP packets will be received allow the elimination of at least tests on the IP address and IP protocol type fields respectively. Similarly, recording computer 140 may be configured to rely upon the checksum of the data link layer to ensure the integrity of a transmission. This avoids testing the various checksums within the IP elements of the message. Testing for a valid RTP header may also be skipped as well as confirming that the packet length is consistent with the IP length indication.

Packet storage 110 is a storage medium such as a high capacity digital data storage device such as a CD-ROM, magnetic hard drive, DVD drive, DAT cassette, flash memory, or some combination of similar devices. Packet storage 110 may also store other information associated with the stored packets, or sessions 111-113, such as the association between stored packets and sessions 111-113 so that the computer communications recorded by recording computer 140 may be reconstructed, replayed, displayed, etc.

Figure 2:
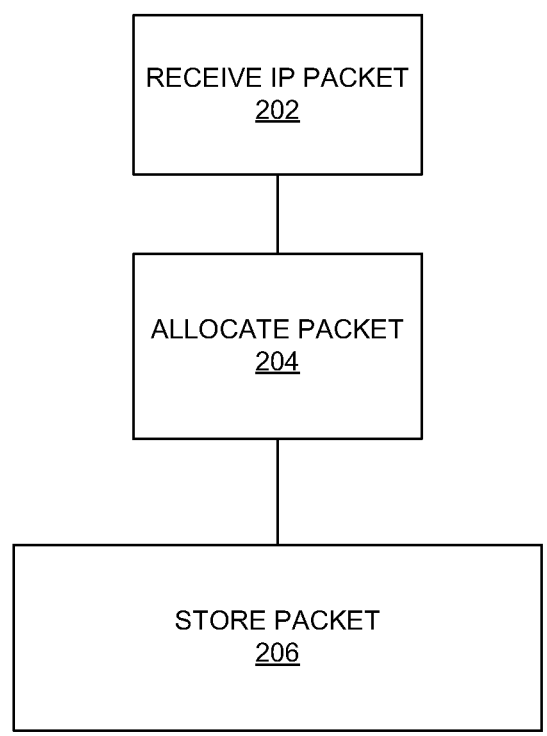
FIG. 2 is a flow diagram illustrating a method for recording computer communication sessions.

FIG. 2 is a flow diagram illustrating a method for recording computer communication sessions. In step 202, an IP packet is received. In step 204, the received packet is allocated. In an embodiment, a received packet may be allocated by examining the value at a fixed location, or offset, in the packet.

In an embodiment, if the packet is formatted as a UDP packet, then the value at the fixed location may be, for example, the destination port number of the packet. In an embodiment, the packet may be allocated based upon the destination port number of the packet. In step 206, the packet is stored. Accordingly, packets may be allocated by using a very simple method (e.g. based upon a value at a fixed location in the packet) and may then be stored without further processing by the transport or application layers thus saving machine cycles or other resources on the recording computer implementing the method.

In an embodiment, the stored packet is associated with other packets that were allocated in the same or similar manner. For example, all packets that were allocated based upon a certain destination port number may be associated with each other. For example, all packets with a destination port number of 2100 would be associated with each other. In an example, if the packets associated with each other were RTP packets, the fields within the stored packet comprising an RTP header allow restoration of the original sequence, detection of missed packets, and removal of duplicate packets as would be done with a standard packet stream such as a VoIP stream.

In another example, all packets that arrived between specific events and were allocated based upon a certain destination port number may be associated. For example, all packets received between the "off hook" and "on hook" signals of VoIP calls from 210-555-3210 and with a destination port number of 2300 would be associated with each other. Other examples and associations are possible for reconstructing, replaying, displaying, etc. the packets stored in step 206.

Figure 3:
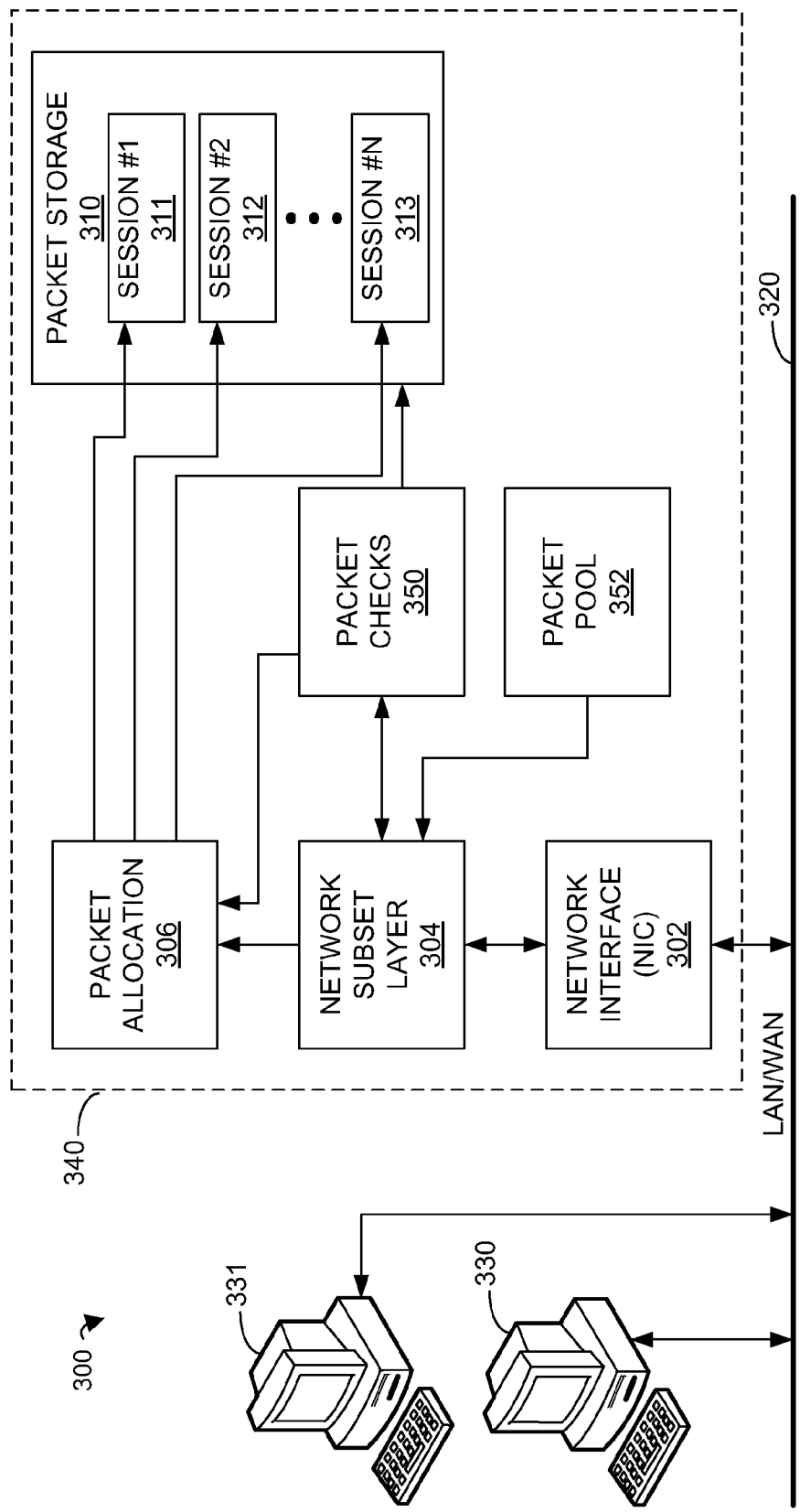
FIG. 3 is a block diagram illustrating a system for recording computer communications.

FIG. 3 is a block diagram illustrating a system for recording computer communication sessions. Communication recording system 300 includes computers 330 and 331 operatively coupled to network 320. Recording computer 340 is also operatively coupled to network 320. Network 320 may be a LAN or a WAN or some other form of computer communications network. Recording computer 340 includes network interface 302. Network interface 302 is operatively coupled to network 320. Network interface 302 is also operatively coupled to network subset layer 304. Network subset layer 304 is operatively coupled to packet allocation 306. Network subset layer 304 is also operatively coupled to packet checks 350. Packet checks 350 is operatively coupled to packet allocation 306 and packet storage 310. Packet pool 352 is operatively coupled to network subset layer 304. Packet allocation 306 is operatively coupled to packet storage 310.

Packet storage includes session #1 311, session #2 312, and session #N 313. Packet allocation 306 is operatively coupled to each of sessions 311-313. Sessions 311-313 may correspond to a group of packets that a recording application desires to group together, such as a voice over IP call (VoIP), or all the packets sent to and from a particular internet phone.

Computers 330 and 331 may direct communications to be recorded to recording computer 340 via network 320. An example of communications that can be directed to recording computer 340 are VoIP telephone calls. For example, to record the contents of a VoIP call between computers 330 and 331, a VoIP application running on computer 331 may send packets to recording computer 340 as if it were also a participant in a conference call. Recording computer 340 could then record the VoIP packets (grouped, for example, as a session #1 311) so that the audio contents of the call may be reconstructed and replayed. In another example, computer 331 may store a local copy of the VoIP or digitized version of a POTS call. At a certain time, perhaps when network 320 and/or computer 331 is not busy, this local copy is then sent to recording computer 340 via network 320.

Other forms of directing communications to recording computer 340 are also possible. For example, using port mirroring, all of the packets that come from, go to, or pass through a given network router, switch, or other device may be directed to recording computer 340 by that device. In an example, these mirrored packets may be encapsulated in order to specify the IP address of NIC 102 thus ensuring proper routing of the packet on its way to NIC 102.

In another example, the mirrored packets may be encapsulated and sent as the payload of an RTP packet stream. The destination IP address of these RTP packets may be set to that of the recorder's dedicated NIC 102, and the UDP port number field is set to a value representing a specific recorded session. Details of which UDP port number relates to which recording session, such as source and destination IP addresses and ports, may be exchanged separately between recording computer 140 and the device that encapsulates the packets. In this case, depending upon the method chosen, recording computer 340 may or may not need to un-encapsulate and/or forward those packets back to network 320 (or another network, not shown) so they may ultimately be routed to the appropriate destination.

In another example, a similar approach may be used with a TCP socket in place of an RTP packet stream. This would allow more reliable transmission of the stream. This increased reliability is particularly important in cases where the occasional loss of a packet is unacceptable. For example, when email is being recorded by recording computer 140, the occasional loss of a packet as may occur when using RTP is unacceptable.

The operative coupling of recording computer 340 and network 320 may be described by a reference model for communications and network protocol design. This description may be referred to as the TCP/IP or Internet reference model and includes five layers. These layers, which are all operatively coupled, may be referred to as the physical layer, the data link layer, the network/internet layer, the transport layer, and the application layer. The physical layer may be implemented by an ASIC or other analog and digital electronics. The elements of the physical layer may reside in network interface 302. The data link layer may also be implemented on network interface 302 by firmware cooperating with hardware driver software in the operating system of recording computer 340. The network layer and transport layer may be implemented in the operating system software running on recording computer 340.

After network interface 302 receives a packet and processes the packet through the physical and data link layers into a form suitable for the network layer, it passes the packet to the network subset layer 304. Network subset layer 304 processes and responds to the packets received from the data link layer to implement at least one of the network layer functions. For example, network subset layer 304 may check the destination address field of the header of a packet in IP form. Examples of IP packet formats are given by IPv4 and IPv6.

In another example, the data link layer may determine that the packet is an Address Resolution Protocol (ARP) request. The network subset layer 104 may then respond appropriately. In another example, the data link layer may determine that the packet is an IP packet. In this case, the network subset layer 104 may pass the packet to the transport layer (e.g. packet allocation 106) without further checks or processing. In addition, network subset layer 304 may also implement other functions or protocols necessary for recording computer 340 to perform the function of recording packets directed to it via network 320.

Packet checks 350 receives packets from network subset layer 304. In an embodiment, packet checks 350 receives a copy of a subset of the packets that network subset layer 304 sends to packet allocation 306. For example, packet checks 350 may only receive a copy of one arbitrarily chosen packet out of a larger number of packets sent to packet allocation 306. For example, only 1 out of every 128 packets sent to packet allocation 306 may also be sent to packet checks 350 for checking. Packet checks 350 may perform one or more checks that are normally performed by the network, transport and/or application layers. For example, packet checks 350 may perform tests that include, but are not limited to: expected packet length; expected payload type; correct IP protocol; correct UDP protocol; correct IP address; and correct Real-time Transport Protocol (RTP) version in header.

If packet checks 350 determines there may be a problem, it may indicate that packets being received by a particular session or recording stream need to be rejected. For example, packet checks 350 may determine that session #2 312 is recording an error condition. In an example, an embodiment may indicate to packet storage 310 that it should stop recording session #2 312. In another example, packet tests may determine that a Denial of Service attack (DoS) is being directed against UDP destination port #2. In this example, an embodiment may direct one or more of network subset layer 304 and packet allocation 306 to stop processing or allocating packets directed to UDP destination port #2. In an embodiment, stopping the processing and/or allocating of packets directed to a UDP port would also stop the recording of a session associated with that UDP port. In another example, an alarm, such as an SNMP trap, may be raised to alert the system administrator and/or automated monitoring tools that packet checks 350 has determined there may be a problem.

Packet pool 352 sends packets to network subset layer 304 for transmission on network 320. Packet pool 352 includes packets that have been preformatted for transmission. These preformatted packets may be complete IP-type packets including header and data portions that are static and not changed over a relatively long period of time. As each packet is prepared for transmission, some number of fields, such as RTP sequence number, timestamp, and any checksum fields, will still have to be set prior to transmission. However, the bulk of the effort, in creating, filling and subsequently destroying the packet object is eliminated by the use and reuse of a pool of pre-prepared packets. These packets may be, for example, IP-type packets further including RTP packets that include VoIP call data for silence, or a beep tone. This way, recording computer 340 may transmit silence, or a beep tone, without doing any extra processing to create those packets.

Recording computer 340 may need to transmit silence, or a beep tone, periodically as part of the process of recording computer communications, or to comply with regulatory requirements. For example, if recording computer 340 is participating in a VoIP call as a conference call participant, then recording computer 340 may need to send VoIP packets filled with silence to the conference bridge so that the conference bridge does not drop recording computer 340 from the conference call thereby ending recording computer 340's ability to record in spite of the fact that the conference call was not over.

Transmit packets may only be formatted once, thus saving machine cycles or other resources on recording computer 340 that would otherwise be spent repeatedly formatting the same transmit packets. For example, for a beep-tone, a set of N (where N is an arbitrary number of packets) packets is typically needed. By repeating these cyclically, a repeating tone is played without the need for continually allocating, filling and releasing packets. In another example, there may still be a need to set the destination address, sequence number and/or timestamp on each packet prior to transmission, but this can be done in place on a small number of pre-filled packets that are reused over and over. This also removes the need for packet objects to be created and destroyed.

Packet allocation 306 receives packets from network subset layer 304. Packet allocation 306 may be part of a transport layer, or may be implemented separately. In an embodiment, packet allocation 306 may accomplish the function of allocating packets passed to it by the network layer by examining the value at a fixed location, or offset, in each packet and using that value as a basis to identify a session.

In an embodiment, if the packet is formatted as a User Datagram Packet (UDP), then the value at the fixed location may be, for example, the destination port number of the packet. In an embodiment, packet allocation 306 may allocate packets based upon the destination port number of the packet. For example, packet allocation 306 may allocate a packet to session #1 311 when the destination port number of the packet is 1. Packet allocation 306 may also allocate a packet to session #2 312 when the destination port number of the packet is 2. This function may also be used with arbitrary port number-session number pairings such as allocating packets with a destination port number of 73 to session #N 313 where "#N" is an arbitrary identifier of the session these packets are to be associated with such as 99, or "VoIP call between 970-555-3234 and 408-555-9876 from 11:05 to 13:07 on Oct. 9, 2007", or email "message-ID=14432593.1191958317010." Once packets are allocated to a session, they are stored in packet storage 310 and associated with the one of sessions 311-313 to which they were allocated.

Packets may be allocated to a recording stream and sent to packet storage 310 without further processing by the transport or application layers, thus saving machine cycles or other resources on recording computer 340. In an embodiment, the allocated packets may be subsequently ordered, duplicates removed, gaps filled and/or payload extracted prior to storage. This may be done so that what is stored is a better approximation to the payload of the stream of RTP packets. In addition, only a subset of all packets arriving may be checked for errors, thus saving machine cycles or other resources on recording computer 340. These machine cycles and resources are saved by not subjecting the packets sent to packet allocation 106 to all of the examination normally undertaken by a full network layer.

The assumption that all IP packets received will be for a single IP address and/or that only UDP packets will be received allow the elimination of at least tests on the IP address and IP protocol type fields respectively. Similarly, recording computer 140 may be configured to rely upon the checksum of the data link layer to ensure various integrity of a transmission. This avoids testing the various checksums within the IP elements of the message. Testing for a valid RTP header may also be skipped as well as confirming that the packet length is consistent with the IP length indication.

Packet storage 310 is a storage medium such as a high capacity digital data storage device such as a CD-ROM, magnetic hard drive, DVD drive, DAT cassette, flash memory, or some combination of similar devices. Packet storage 310 may also store other information associated with the stored packets, or sessions 311-313, such as the associations between stored packets and sessions 311-313 so that the computer communications recorded by recording computer 340 may be reconstructed, replayed, displayed, etc.

Figure 4:
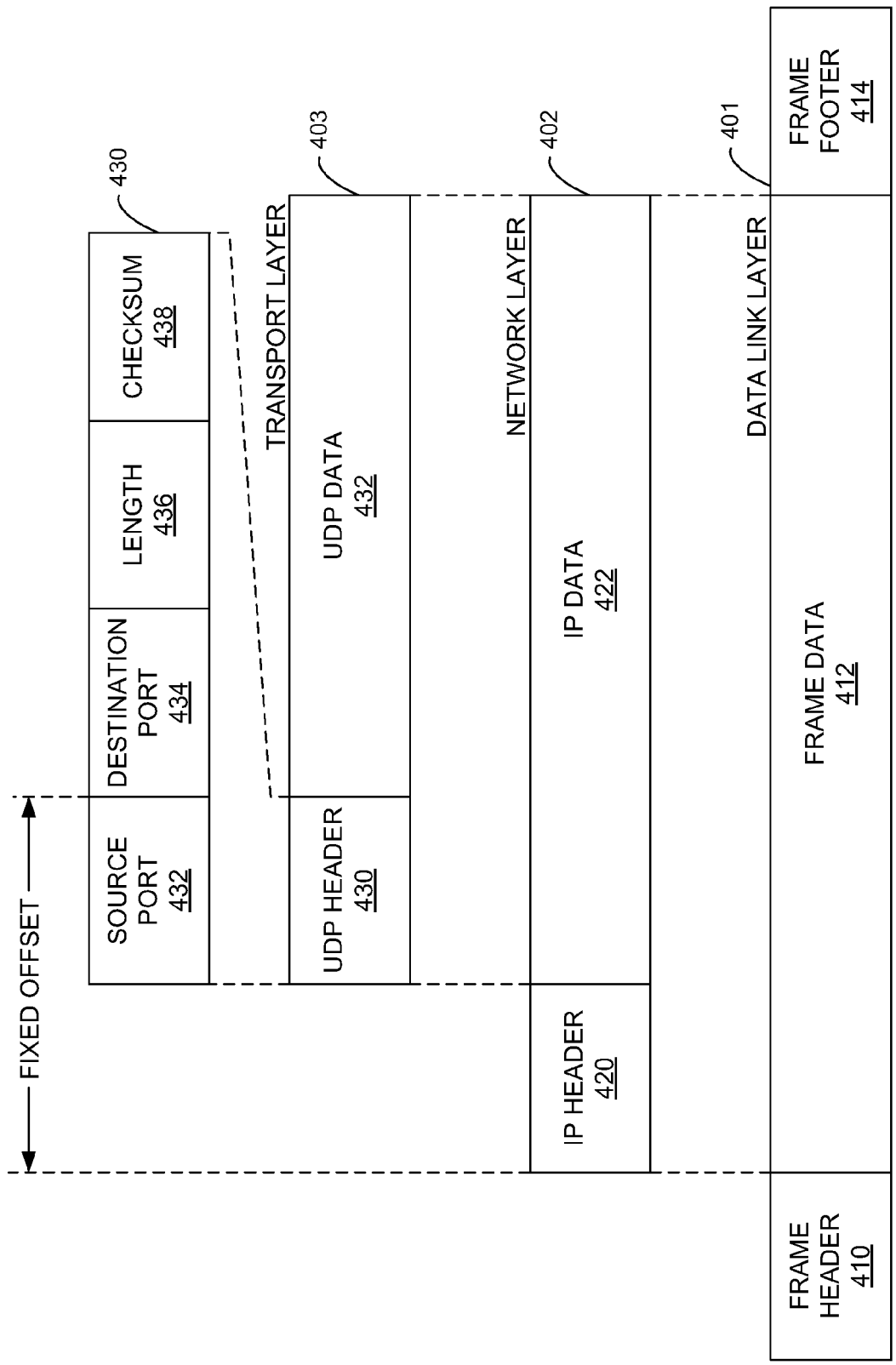
FIG. 4 is an illustration of a value at a fixed position within a packet that may be used to allocate packets.

FIG. 4 is an illustration of a value at fixed position within a packet that may be used to allocate packets. The value at the fixed position may be used as a session identifier. A data link layer packet 401 includes frame header 410, frame data 412, and frame footer 414. Frame data 412 may be formatted as network layer packet 402. Network layer packet 402 may be comprised of fixed length IP header 420 and IP data 422. IP data 422 may be formatted as transport layer packet 403. Transport layer packet 403 may be formatted as fixed length UDP header 430 and UDP data 432. UDP header 430 may be further divided into source port field 432, destination port field 434, length field 436, and checksum field 438. Each of these fields may be of a fixed length.

In this example, since IP header 420, UDP header 430, and source port field 432 are all of a fixed length, UDP destination port field 434 may be read directly from any of frame data 412, IP packet, or UDP packet by examining the data that is at a fixed location, or fixed offset, in frame data 412, IP packet, or UDP packet, respectively. In other words, if it is assumed that the only type of packet that is being processed is a UDP packet, the UDP destination port number can be read directly from an IP packet by examining a fixed location in the IP packet without further processing. This UDP destination port number can then be used as a session identifier to allocate the packet to a session. Accordingly, this allocation may be accomplished directly from an IP packet without the additional processing that is typically done by the network and transport layers prior to extracting the UDP destination port.

Figure 5:
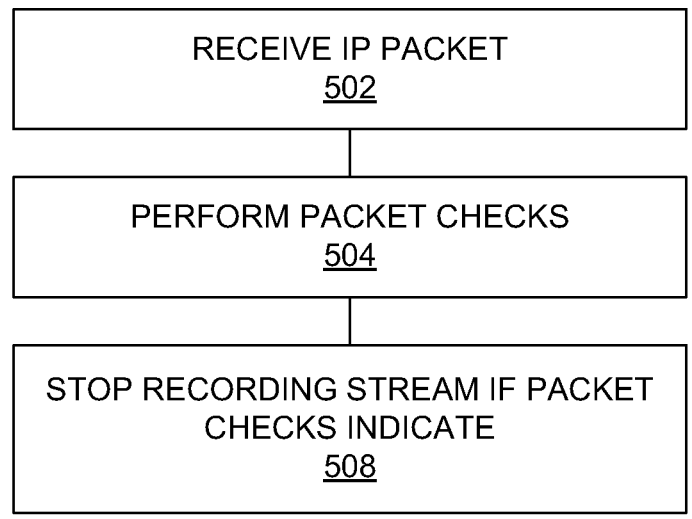
FIG. 5 is a flow diagram illustrating a method of resisting packet errors or service disruption attacks.

FIG. 5 is a flow diagram illustrating a method of resisting packet errors or service disruption attacks. In step 502, an IP packet is received. In an embodiment, this packet is a subset of the packets received or processed by a network subset layer of a TCP/IP stack. For example, this method may only receive a copy of one arbitrarily chosen packet out of a larger number of packets received. For example, only 1 out of every 128 packets received by a network subset layer of a TCP/IP stack be received for checking. In step 504, checks are performed on the received packet. These checks may be one or more checks that are normally performed by the network, transport and/or application layers. For example, these tests may include, but are not limited to: expected packet length; expected payload type; correct IP protocol; correct UDP protocol; correct IP address; and correct RTP version in header.

In step 508, if step 504 determined there may be a problem, then it may indicate that packets being received by a particular session or recording stream need to be rejected. For example, step 504 may determine that session #2 312 is recording an error condition. In this example, an embodiment of step 508 may indicate to packet storage 310 that it should stop recording session #2 312. In another example, step 504 may determine that a DoS attack is being directed against UDP destination port #2. In this example, an embodiment of step 508 may direct one or more of network subset layer 304 and packet allocation 306 to stop processing or allocating packets directed to UDP destination port #2. In an embodiment, stopping the processing and/or allocating of packets directed to a UDP port would also stop the recording of a session associated with that UDP port. In another example, an alarm, such as an SNMP trap, may be raised to alert the system administrator and/or automated monitoring tools that packet checks 350 has determined there may be a problem.

Figure 6:
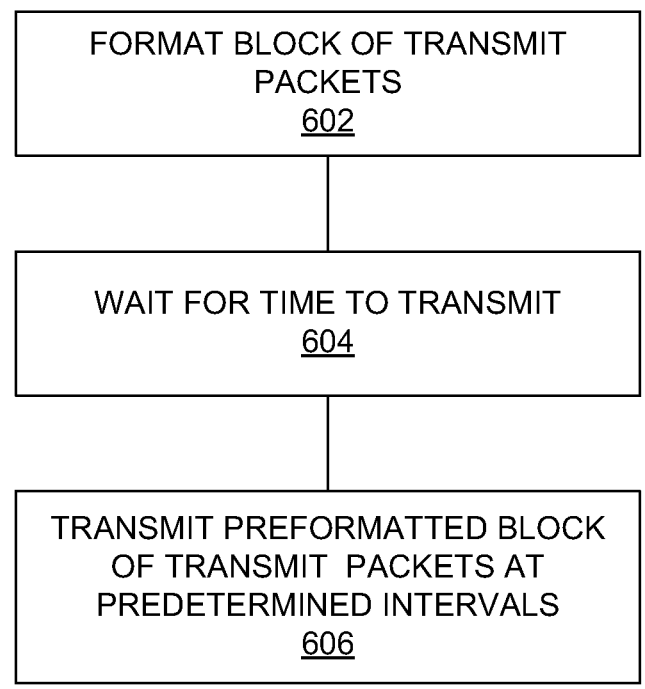
FIG. 6 is a flow diagram illustrating a method of providing packets suitable for transmission by a recording computer.

FIG. 6 is a flow diagram illustrating a method of providing packets suitable for transmission by a recording computer. In step 602, a block of packets is formatted for transmission. These preformatted packets may be complete IP-type packets including header and data portions that are static and not changed over a relatively long period of time. As each packet is prepared for transmission, some number of fields, such as RTP sequence number, timestamp, and any checksum fields, will still have to be set prior to transmission. However, the bulk of the effort, in creating, filling and subsequently destroying the packet object is eliminated by the use and reuse of a pool of pre-prepared packets. These packets may be, for example, IP-type packets further including RTP packets that include VoIP call data for silence, or a beep tone. In step 604, the method waits for the time to transmit.

In step 606, the preformatted block of transmit packets is transmitted at predetermined intervals. The block of packets is not changed or otherwise processed between predetermined intervals, thus avoiding any steps or processing of the preformatted packets. Using this method, recording computer 340 may transmit silence, or a beep tone, without doing any extra processing to create those packets. Recording computer 340 may need to transmit silence, or a beep tone, periodically as part of the process of recording computer communications or to comply with regulatory requirements. For example, if recording computer 340 is participating in a VoIP call as a conference call participant, then recording computer 340 may need to send VoIP packets filled with silence to the conference bridge so that the conference bridge does not drop recording computer 340 from the conference call thereby ending recording computer's ability to record in spite of the fact that the conference call was not over. This method allows recording computer 340 to accomplish the transmission of silence or a beep tone with less processing.

Computers 130, 131, 330, 331, and recording computers 140 and 340 may all be computer systems or contain computer systems. These computer systems are illustrated, by way of example, in FIG. 7.

Figure 7:
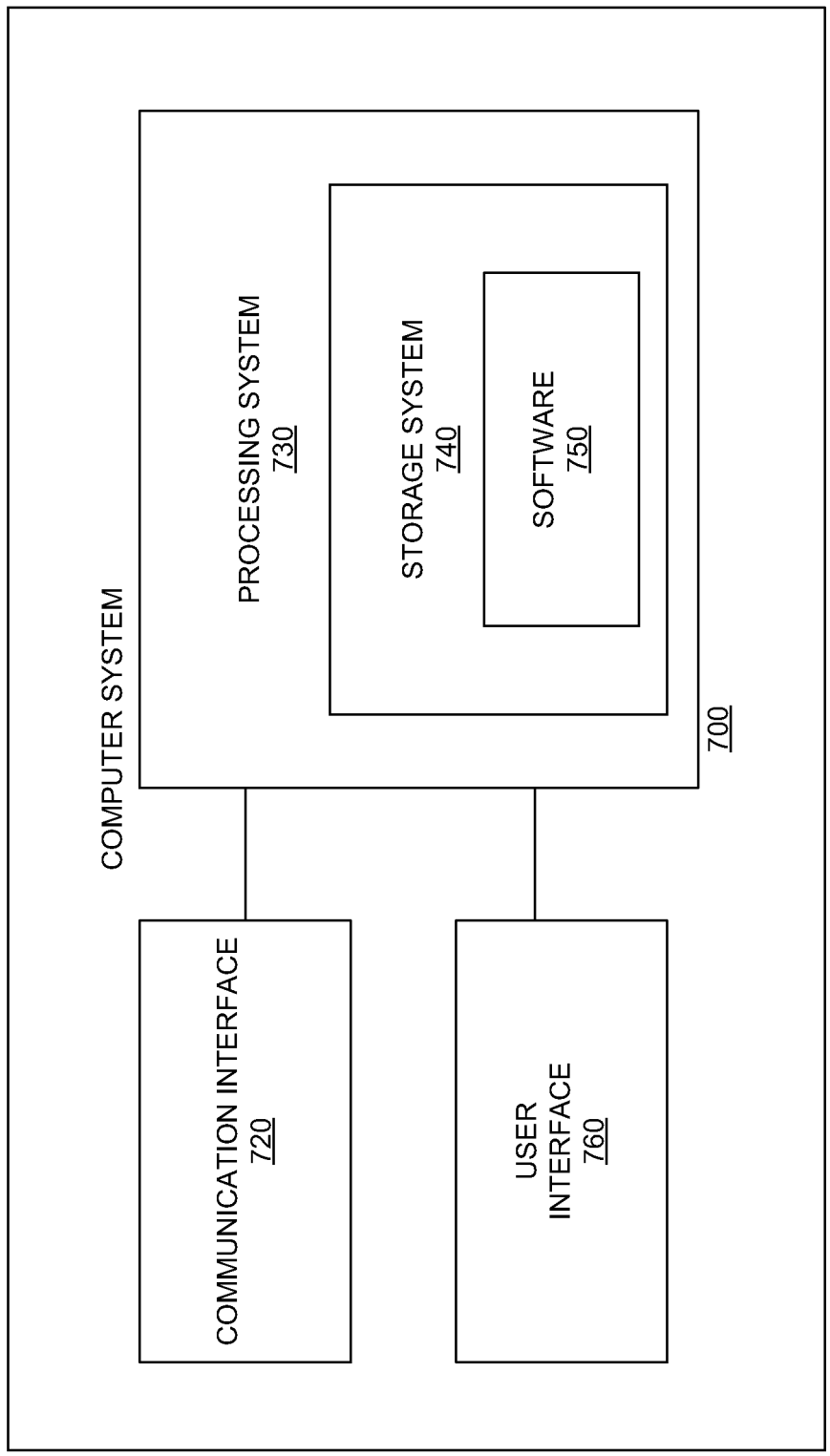
FIG. 7 is a block diagram illustrating a computer system.

FIG. 7 illustrates a block diagram of a computer system. Computer system 700 includes communication interface 720, processing system 730, and user interface 760. Processing system 730 includes storage system 740. Storage system 740 stores software 750. Processing system 730 is linked to communication interface 720 and user interface 760. Computer system 700 could be comprised of a programmed general-purpose computer, although those skilled in the art will appreciate that programmable or special purpose circuitry and equipment may be used. Computer system 700 may be distributed among multiple devices that together comprise elements 720-760.

Communication interface 720 could comprise a network interface, modem, port, transceiver, or some other communication device. Communication interface 720 may be distributed among multiple communication devices. Processing system 730 could comprise a computer microprocessor, logic circuit, or some other processing device. Processing system 730 may be distributed among multiple processing devices. User interface 760 could comprise a keyboard, mouse, voice recognition interface, microphone and speakers, graphical display, touch screen, or some other type of user device. User interface 760 may be distributed among multiple user devices. Storage system 740 could comprise a disk, tape, integrated circuit, server, or some other memory device. Storage system 740 may be distributed among multiple memory devices.

Processing system 730 retrieves and executes software 750 from storage system 740. Software 750 may comprise an operating system, utilities, drivers, networking software, and other software typically loaded onto a computer system. Software 750 could comprise an application program, firmware, or some other form of machine-readable processing instructions. When executed by processing system 730, software 750 directs processing system 730 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above but only by the following claims and their equivalents.

What is claimed is:

1. A method of recording computer communications, comprising:
   receiving, by a transport layer of a recording computer, a first IP packet directed to a recording network interface of the recording computer, wherein the transport layer receives the first IP packet from a recording network interface of the recording computer;
   allocating, by the transport layer of the recording computer, the first IP packet to a first recording stream of packets based only upon examining a single value located at a first fixed offset in the first IP packet, wherein the single value located at the first fixed offset in the first IP packet is a destination port number; and wherein the allocation is performed without testing a protocol type field of the first IP packet; and
   storing at the recording computer at least a portion of the first IP packet associated with the first recording stream of packets.

2. The method of claim 1, further comprising:
   receiving, by the transport layer of the recording computer, a second IP packet directed to the recording network interface of the recording computer;
   allocating, by the transport layer of the recording computer, the second IP packet to a second recording stream of packets based only upon examining a single value located at the first fixed offset in the second IP packet, wherein the single value located at the first fixed offset in the second IP packet is a destination port number of the second IP packet; and wherein the allocation is performed without testing a protocol type field of the first IP packet; and
   storing at the recording computer at least a portion of the second IP packet associated with the second recording stream of packets.

3. The method of claim 1, further comprising:
   checking the second IP packet for an indication that storing of the second recording stream of packets should be stopped; and
   stopping storing the second recording stream of packets if the checking of the second IP packet indicates that storing of the second recording stream of packets should be stopped.

4. The method of claim 1, wherein the first IP packet is also a UDP packet and the single value located at the first fixed offset within the first IP packet is a UDP port number.

5. The method of claim 1, further comprising:
   checking the second IP packet to determine that a Denial of Service attack (DoS) is being directed against the destination port of the second IP packet; and
   directing the transport layer to stop allocating packets directed to the destination port of the second IP packet.

6. A system of recording computer communications, comprising:
   a recording computer comprising a network interface, a packet allocator, and a packet store;
   wherein the network interface receives a plurality of IP packets to be recorded;
   wherein the packet allocator allocates the plurality of IP packets to a first recording stream based only upon examination of a single value located at a first fixed offset in each of the plurality of IP packets; wherein the single value located at the first fixed offset in each of the plurality of IP packets is a destination port number; and wherein the allocation is performed without testing a protocol type field of the plurality of IP packets; wherein the packet allocator is part of a transport layer of the recording computer; and
   wherein the packet storage stores the first recording stream.

7. The system of claim 6, wherein the recording computer further comprises:
   a packet checker that checks a subset of the plurality of IP packets for an indication that storing of the first recording stream should be stopped.

8. The system of claim 6, wherein the recording computer further comprises:
   a packet pool of preformatted packets, wherein the preformatted packets are transmitted to a network interface at predetermined intervals.

9. The system of claim 8, wherein the packet pools correspond to silent audio.

10. The system of claim 8, wherein the packet pools correspond to a beep tone.

11. The system of claim 6, further comprising:
    a packet checker that checks a subset of the plurality of IP packets to determine that a Denial of Service attack (DoS) is being directed against the destination port of the plurality of packets and directs the packet allocator to stop allocating packets directed to the destination port of the plurality of packets.

12. A non-transitory computer readable medium having instructions stored thereon for recording computer communications that, when executed by a recording computer, direct the recording computer to:
    receive, by a transport layer of the recording computer, a first IP packet directed to a recording network interface of the recording computer, wherein the transport layer receives the first IP packet from a recording network interface of the recording computer;
    allocate, by the transport layer of the recording computer, the first IP packet to a first recording stream of packets based only upon examination of a single value located at a first fixed offset in the first IP packet, wherein the single value located at the first fixed offset in the first IP packet is a destination port number; and wherein the allocation is performed without testing a protocol type field of the first IP packet; and store at the recording computer at least a portion of the first IP packet associated with the first recording stream of packets.

13. The non-transitory computer readable medium of claim 12 wherein the instructions, when executed by the recording computer, further direct the recording computer to:

receive, by the transport layer of the recording computer, a second IP packet directed to the recording network interface of the recording computer;

allocate, by the transport layer of the recording computer, the second IP packet to a second recording stream of packets based only upon examining a single value located at the first fixed offset in the second IP packet, wherein the single value located at the first fixed offset in the second IP packet is a destination port number of the second IP packet; and wherein the allocation is performed without testing a protocol type field of the second IP packet; and store at the recording computer at least a portion of the second IP packet associated with the second recording stream of packets.

14. The non-transitory computer readable medium of claim 13, wherein the instructions, when executed by the recording computer, further direct the recording computer to:

check the second IP packet for an indication that storing of the second recording stream of packets should be stopped; and stop storing the second recording stream of packets if the checking of the second IP packet indicates that storing of the second recording stream of packets should be stopped.

15. The non-transitory computer readable medium of claim 14 wherein the instructions, when executed by the recording computer, further direct the recording computer to:

pre-format a block of transmit packets; and transmit the block of transmit packets at predetermined intervals.

16. The non-transitory computer readable medium of claim 15, wherein the block of transmit packets corresponds to silence.

17. The non-transitory computer readable medium of claim 12 wherein the instructions, when executed by the recording computer, further direct the recording computer to:

check the second IP packet for an indication that storing of the first recording stream of packets should be stopped; and stop storing the first recording stream of packets if the checking the second IP packet indicates that storing of the first recording stream of packets should be stopped.

18. The non-transitory computer readable medium of claim 12 wherein the instructions, when executed by the recording computer, further direct the recording computer to:

pre-format a block of transmit packets; and transmit the block of transmit packets at predetermined intervals.

19. The non-transitory computer readable medium of claim 18, wherein the block of transmit packets correspond to silence.

20. The non-transitory computer readable medium of claim 18, wherein the block of transmit packets correspond to a tone.

21. The non-transitory computer readable medium of claim 12 wherein the first IP packet is also a UDP packet and the single value located at the first fixed offset within the first IP packet is a UDP port number.

22. The non-transitory computer readable medium of claim 12 wherein the instructions, when executed by the computer system, further direct the computer system to:

check the second IP packet to determine that a Denial of Service attack (DoS) is being directed against the destination port of the second IP packet; and direct the transport layer to stop allocating packets directed to the destination port of the second IP packet.

* * * * *

UNITED STATES PATENT AND TRADEMARK OFFICE
CERTIFICATE OF CORRECTION

PATENT NO. : 9,455,896 B2
APPLICATION NO. : 12/015621
DATED : September 27, 2016
INVENTOR(S) : Christopher Douglas Blair It is certified that error appears in the above-identified patent and that said Letters Patent is hereby corrected as shown below:

In the Claims

Column 11, Line 64, "method of claim 1" should read --method of claim 2--

Column 12, Line 8, "method of claim 1" should read --method of claim 2--

Column 14, Lines 7-8, "non-transitory computer readable medium of claim 12" should read --non-transitory computer readable medium of claim 13--

Column 14, Lines 32-33, "non-transitory computer readable medium of claim 12" should read --non-transitory computer readable medium of claim 13--

Signed and Sealed this
Twentieth Day of June, 2017

Joseph Matal
*Performing the Functions and Duties of the
Under Secretary of Commerce for Intellectual Property and
Director of the United States Patent and Trademark Office*